United States Patent Office 3,235,529
Patented Feb. 15, 1966

3,235,529
FREE FLOWING POLYSTYRENE POWDERS
CONTAINING 10–40% PLASTICIZER
Floyd B. Nagle, Midland, Mich., assignor to The Dow
Chemical Company, Midland, Mich., a corporation of
Delaware
No Drawing. Filed Sept. 6, 1960, Ser. No. 53,886
3 Claims. (Cl. 260—33.6)

This invention relates to a method of incorporating into thermoplastic vinyl aromatic resins certain liquid additaments that are difficult to incorporate in such resins by mechanical means. More specifically it relates to a method of producing compositions comprising such resins and relatively large amounts of mineral oil. Furthermore, it relates to the use of such compositions in the compounding and processing of the thermoplastic vinyl aromatic resin itself.

When vinyl aromatic resins are molded by usual compression or injection molding methods, several difficulties are encountered in producing accurate moldings at the rapid rates required in commercial operation. For instance, the vinyl aromatic resins; e.g., polystyrene, are often undesirably resistant to rapid flow during molding. The heat-plastified resin frequently fails to flow into all recesses of the mold, or fails to coalesce or weld together in the mold to form a molded product free of weld lines or weakened areas. The molded products frequently stick to the mold in which they are formed with resultant scratching, marring or breaking of the molded articles upon dislodging or ejecting the same from the mold. Such difficulties have been particularly pronounced in producing irregular shaped articles by the injection molding method.

The rate of flow of a vinyl aromatic resion during molding may readily be increased by incorporating any of a variety of known plasticizing agents with the resin prior to molding. Of these plasticizing agents it has been found that white mineral oil is particularly desirable inasmuch as it is effective in amounts which do not cause appreciable impairment of the properties of the molded article. That is, it does not lead to serious reduction in tensile strength, lowering of the heat distortion temperature, or undesired changes in the dielectric properties. Additionally, it shows no tendency to give rise to discoloration in the molded article.

Mineral oils suitable for use are selected from the refined colorless, or substantially colorless, mineral oils consisting principally of saturated aliphatic hydrocarbons. Such mineral oils are known to the trade as "white mineral oil," and are substantially free of unsaturated compounds or aromatic radicals; e.g., the phenyl or naphthyl radical. They are substantially non-volatile both at room temperature and under usual molding conditions; i.e., they boil at a temperature of 200° C. or higher at 760 millimeters of mercury absolute pressure. They ordinarily possess a viscosity lying in the range of from 10 to 70 centistokes at 100° F.

Despite the advantages to be gained from the use of mineral oil there are, nevertheless, difficulties encountered in its employment, the difficulty depending on the mode of incorporating it in the resin.

Thus, if the mineral oil be added to the resin by being pumped into the additive ports of an extruder, poor mixing results. This appears to be due to both the great difference in the viscosity of the oil and that of the resin and to the lubricating quality of the oil. Furthermore, when a relatively large amount of the oil is attempted to be blended into the resin in this manner, a portion of it may appear free at the extruder nozzle. Under these conditions the lubricating effect may lead to a sharply reduced rate of resin extrusion. It may, in fact, interrupt extrusion completely.

The mineral oil may, of course, be incorporated in the resin during the manufacture of the latter. Specifically, for example, it may be dissolved in styrene monomer prior to the carrying out of the polymerization. The resulting polymer will thus ordinarily have its content of the oil uniformly distributed throughout its mass. Because of this uniformity of composition the above described difficulties of extrusion do not occur. However, if polymers of varying content of mineral oil are desired, uneconomical tie-up of equipment occurs. Finally, because of the limited compatability of mineral oil in polystyrene, compositions containing a desirably high content of mineral oil cannot readily be prepared. Such compositions would be of obvious utility inasmuch as one with a sufficiently high content of mineral oil could be blended with untreated polystyrene in any proportion to give a product of desired oil content. This would obviate the difficulty of equipment tie-up and make for generally more efficient operation.

It is, therefore, a primary object of the invention to provide an improved method of incorporating mineral oil and similar relatively incompatible additaments into thermoplastic vinyl aromatic resins. It is additionally an object of the invention to provide a uniform admixture or blend of such resin and mineral oil in which the oil is present in relatively large amount. It is a further object to provide such an admixture that is adapted to being added to and mixed with thermoplastic vinyl aromatic resin as a source of mineral oil as a processing aid therefor. Additional objects of the invention will be evident from the following description.

According to the invention, it has been found that vinyl aromatic resins, if in a sufficient state of subdivision, are capable of absorbing relatively large amounts of the oil without losing the characteristic of being freely flowable. Furthermore, the oil-loaded, free flowing resins may be densified, as by being pelletized or extruded, to give an easily handled source of mineral oil that may be readily blended with additional resin to provide such additional resin with a minor content of mineral oil.

The thormoplastic vinyl aromatic resin may most conveniently be obtained in the proper state of subdivision by the spray drying of its latex. By the use of the spray drying technique the resin may be obtained as a dry, dusty powder, the individual particles of which are generally spherical and which have a diameter of from about 0.25 micron to about 5 microns. These individual particles may be agglomerated into larger, porous particles that are generally spherical and which may have a diameter of up to about 150 microns. The powdered resin is relatively light in weight, having a bulk density not in excess of about 0.5 gm./cc.

The vinyl aromatic resins to be employed are the solid polymers and copolymers of vinyl aromatic compounds having the vinyl group attached to a carbon atom of the aromatic nucleus. Examples of the thermoplastic vinyl aromatic resins with which the invention is concerned are polystyrene, the solid polymers of para-methylstyrene, meta-ethylstyrene, ortho-chlorostyrene, para-isopropylstyrene, para-chlorostyrene, ortho, para-dimethylstyrene, and solid resinous copolymers of any of the corresponding monovinyl aromatic compounds, or styrene, with other polymerizable unsaturated organic compounds containing an ethylenic group such as vinyl chloride, ethyl acrylate, methyl methacrylate, acrylonitrile, alpha-methylstyrene, alpha-ethylstyrene or para-methyl-alpha-methylstyrene. The invention pertains especially to molding compositions comprising polystyrene as the vinyl aromatic resin component.

The mineral oil may be incorporated with the finely divided resin in any of the mixing devices adapted to the blending of liquids into solid material. Conveniently, a tumbler or a ribbon blender may be employed, the mineral oil being added in small increments to the agitated resin powder. Dispersion of the oil takes place readily, there being little tendency for the added oil to cause clumping of the resin.

It has been determined that usable compositions of resin and mineral oil containing as much as about 40 percent by weight of the latter may be prepared. In general, for reasons of economy, it is preferred to employ the mineral oil in this high concentration although compositions having a content of mineral oil of as little as 10 percent will be found to be of practical utility.

If desired, the mineral oil may be admixed with a minor amount of other desired processing aids or compounding ingredients. For example, oil soluble or oil dispersible dyes or pigments may be added to the oil prior to blending it with the resin so that there is obtained a uniformly colored product well suited to use as a master batch in the preparation of colored resin bodies. Various plasticizers may advantageously be added to the oil in relatively minor amounts so that they may be readily and uniformly admixed with or dispersed in the vinyl aromatic resin. Examples of materials that may be so incorporated with the mineral oil include butyl stearate, soybean oil, linseed oil and other drying oils or the like.

In spite of the unexpectedly high mineral oil content it is possible to achieve in the resin-oil admixtures, hereinafter referred to as "concentrates," no difficulties as to storage stability of the concentrates result therefrom. In other words, no bleeding of oil from the concentrate occurs. The materials retain in large measure the flowability they possess when freshly prepared. They do not tend to cake, fuse or compact on standing. This is in contrast to the behavior of similar admixtures of finely divided vinyl aromatic resins and processing aids such as the various ester plasticizers. Thus, a concentrate of resin and butyl stearate prepared in a similar manner will originally be free flowing but will tend, on standing for only a few days, to compact to a solid, non-friable mass.

The non-bleeding characteristics of the concentrates of the present invention impart a further advantage to them in addition to the retention of flowability. Thus, the concentrates may be compacted into pellets or tablets for easier handling without loss of oil content. This may be done in the usual manner by extrusion and the cutting of the extrudate into pieces of the desired size or by using known pelletizing techniques. In this way a free-flowing, granular material is obtained that is adapted to easier feeding to an extruder, for example, than is the powdered form of the concentrate.

The invention is further illustrated in and by the following examples which are intended to be demonstrative and not limiting and wherein, unless otherwise noted, all parts and percentages are on a weight basis.

*Example 1*

Finely divided polystyrene was prepared by the spray drying of a polystyrene latex containing about 30 percent of the polymer. The powder obtained had a bulk density of approximately 0.40 gm./cc.

To 80 parts of the finely divided polystyrene contained in a ribbon blender there were added slowly, with agitation, 20 parts of white mineral oil having a viscosity of 31.5 centistokes at 100° F. Agitation was continued until the oil was uniformly distributed throughout the resin. The product was a dry, free-flowing powder, substantially indistinguishable from the untreated powdered resin.

*Example 2*

The oil-loaded powdered resin of Example 1 was fed to a two inch laboratory extruder operating at a temperature of 200° C. The resin extruded smoothly and was cooled and cut into pellets. No separation of mineral oil was noted at the extruder head.

*Example 3*

Ten parts of the pelletized extrudate of Example 2 were thoroughly blended with 90 parts of granular polystyrene to give a mixture containing 2 percent of mineral oil. This material extruded smoothly with no separation of mineral oil at the extruder head.

For the sake of comparison, there was prepared a mixture wherein the mineral oil was blended directly with the polystyrene, rather than through the agency of a concentrate. To 98 parts of polystyrene molding granules contained in a ribbon blender there were added 2 parts of white mineral oil having a viscosity of 31.5 centistokes at 100° F. After the granules were thoroughly and evenly coated with the oil they were fed to a two inch laboratory extruder, the barrel of which was maintained at a temperature of 200° C. No extrusion occurred.

*Example 4*

The extrudate obtained in Example 3, containing 2 percent of mineral oil, was chopped to give granules of a size suitable for injection molding. Injection molded test pieces prepared from this material were free of any optical distortion which would be indicative of uneven dispersion of the oil in the resin.

*Example 5*

A sample of the oil-loaded powdered resin of Example 1 was stored at room temperature for a period of 6 weeks. No lumping or loss of flowability occurred.

*Example 6*

Following the procedure outlined in Example 1, a concentrate of 60 parts of resin and 40 parts of white mineral oil was prepared. This material was a non-dusty powder which exhibited some tendency to coalesce into fragile lumps. It was readily converted into pellets in a California Pellet Mill without loss of oil. These pellets showed no evidence of bleeding of oil after 6 weeks of storage at room temperature.

*Example 7*

Five parts of the pelletized product of Example 6 were intimately blended with 95 parts of granular polystyrene to give a mixture containing 2 percent of mineral oil. This blended material extruded smoothly with no separation of mineral oil at the extruder head.

*Example 8*

To 65 parts of the finely divided polystyrene contained in a ribbon blender there were added slowly with good agitation 35 parts of a mixture containing equal amounts of white mineral oil and butyl stearate. There was obtained, a dense, free-flowing, non-dusty power. This product showed no loss of flowability on standing and was capable of being pelletized without significant exudation of fluid.

In contrast, a similarly prepared blend consisting of 75 parts of polystyrene and 25 parts of butyl stearate, although a relatively free-flowing powder when freshly prepared, coalesced into a relatively hard cake on standing for a period of two days. Furthermore, the compressive forces encountered in pelletizing the powder caused bleeding of the butyl stearate from the mass.

What is claimed is:

1. A finely divided composition of matter comprising a substantially uniform admixture of from about 10 percent to about 40 percent by weight of white mineral oil and from 60 percent to about 90 percent by weight of finely divided particles of polystyrene of sizes between 0.25 and 5 microns and having a bulk density of less than about 0.5 gm./cc.

2. A finely divided composition of matter comprising a substantially uniform admixture of from about 60 to 90 percent by weight of finely divided particles of sizes between 0.25 and 5 microns and having a bulk density of less than about 0.5 gm./cc. of a styrene polymer and correspondingly from about 40 to 10 percent by weight of a liquid additament for said polymer which liquid consists of at least 50 percent by weight of white mineral oil and not more than a minor proportion of another plasticizer for said polymer that is miscible with the white mineral oil.

3. A finely divided composition of matter comprising a substantially uniform admixture of from about 60 to 90 percent by weight of finely divided particles of polystyrene of particles of sizes between 0.25 and 5 microns and having a bulk density of less than about 0.5 gm./cc. and from about 40 to 10 percent by weight of a liquid additament therefor which consists of approximately equal parts by weight of butyl stearate and white mineral oil.

References Cited by the Examiner
UNITED STATES PATENTS

| | | | |
|---|---|---|---|
| 2,455,890 | 12/1948 | Fawcett et al. | 260—33.6 |
| 2,619,478 | 11/1952 | Wehr et al. | 260—33.6 |
| 2,834,746 | 5/1958 | Salyer et al. | 260—33.6 |
| 2,834,750 | 5/1958 | Salyer et al. | 260—33.6 |
| 3,029,223 | 4/1962 | Hibbard | 260—33.6 |

MORRIS LIEBMAN, *Primary Examiner.*

DANIEL ARNOLD, LEON J. BERCOVITZ,
*Examiners.*